United States Patent [19]

Enomoto

[11] Patent Number: 5,352,875
[45] Date of Patent: Oct. 4, 1994

[54] TERMINAL FOR AN IC CARD
[75] Inventor: Yoshiharu Enomoto, Nara, Japan
[73] Assignee: Sharp Kabushiki Kaisha, Osaka, Japan
[21] Appl. No.: 868,496
[22] Filed: Apr. 15, 1992
[30] Foreign Application Priority Data Apr. 16, 1991 [JP] Japan .................................. 3-083691

[51] Int. Cl.⁵ .............................................. G06K 5/00
[52] U.S. Cl. ..................................... 235/380; 361/796
[58] Field of Search ....................... 361/415, 796, 797; 364/709.1; 235/380

[56] References Cited

U.S. PATENT DOCUMENTS

| | | | |
|---|---|---|---|
| 4,091,446 | 5/1978 | Demonte et al. | 364/709.1 |
| 4,153,937 | 5/1979 | Poland | 364/709.1 |
| 4,385,366 | 5/1983 | Housey Jr. | 364/709.1 |
| 5,036,461 | 7/1991 | Elliott et al. | 235/380 |
| 5,172,306 | 12/1992 | Cantrell | 361/415 |

*Primary Examiner*—E. Rollins Cross
*Assistant Examiner*—Erick Solis
*Attorney, Agent, or Firm*—Nixon & Vanderhye

[57] ABSTRACT

A terminal for an IC card is provided, which has an IC card storing an application program, a terminal body for an IC card in which the IC card is set, and at least one memory card which is set in the terminal body for an IC card, wherein the terminal body for an IC card has a first storage for storing a monitor program, the memory card has a second storage for storing at least one program, and the application program stored in the IC card is executed in accordance with processing of the monitor program and processing of the program stored in the memory card.

6 Claims, 5 Drawing Sheets

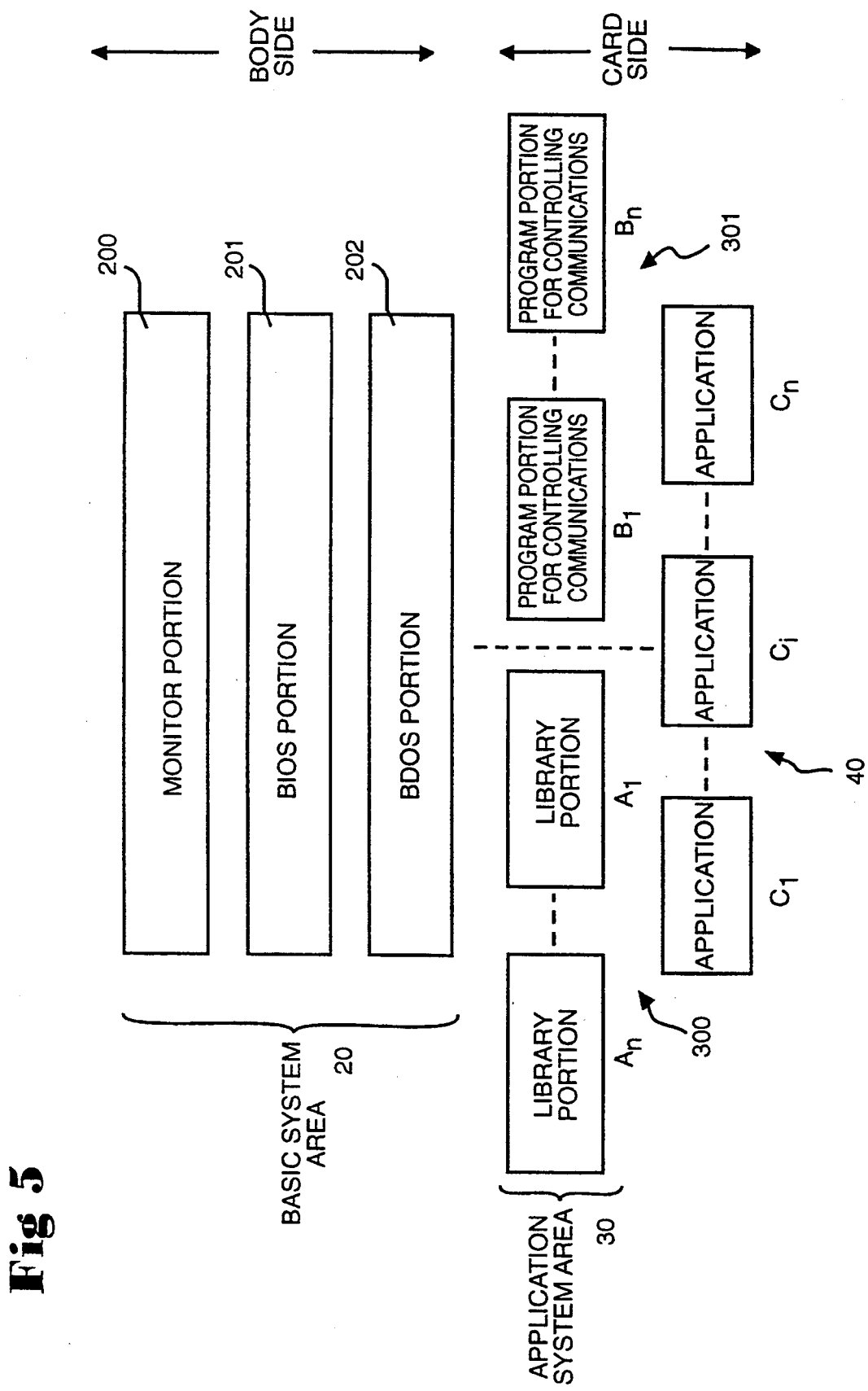

TERMINAL FOR AN IC CARD

BACKGROUND OF THE INVENTION

1. Field of the Invention:

The present invention relates to a terminal for an IC card used in various kinds of industrial fields such as banking, the medical industry, and the transportation industry.

2. Description of the Prior Art:

A conventional example of this kind of terminal for an IC card is shown in FIG. 7. According to this example, the terminal for an IC card has a system structure including a number of programs all stored in a ROM mounted in a terminal body. One program, related to a basic system area 20, includes a monitor portion 200, a BIOS portion 201, and a BDOS portion 202. Another program, related to an application system area 30, includes a library portion 300 and a program portion 301 for controlling various kinds of communications and defining the protocol of asynchronous half-duplex/full-duplex, basic/HDLC (High-level Data Link Control)-/ANSER (Automatic answer Network System for Electrical Request), etc. Also included is an application program related to an application program area 40.

According to the conventional system structure, in most cases, programs are not assorted by hierarchies or categories thereof to be stored in the ROM. Moreover, most of the ROMs are mask ROMs and OTP ROMs (One time programmable ROM). Because of this, once a ROM which stores a program is produced, it is almost impossible to change the program.

Furthermore, when a ROM is mounted in the terminal body, it is required to disassemble the terminal to exchange the ROM, thereby changing the program. Since it is difficult for a user to disassemble the terminal, the terminal to be disassembled should be passed through a production line again. Especially, in the case of an IC card (based on ISO), there are communication protocols (protocol type: international standards of $T=0$ (character transmission system) and $T=1$ (block transmission system); and a regulation in each country of $T=14$ (local transmission system)) of various kinds of systems between the IC card and the terminal (IFD: Interface Device). Because of this, it is difficult to cope with various kinds of IC cards which are generally used by mounting the ROM storing communication programs for IC cards including the above-mentioned protocols in the terminal for an IC card, and the applicability of the terminal becomes substantially inferior.

As described above, according to the conventional terminal for an IC card, operations for a number of purposes and/or of various kinds have been difficult to be coped with. Moreover, there has been a disadvantage in that the terminal is less versatile in its applicability.

SUMMARY OF THE INVENTION

The terminal for an IC card of this invention, which overcomes the above-discussed and numerous other disadvantages and deficiencies of the prior art, comprises an IC card storing an application program, a terminal body for an IC card in which the IC card is set, and at least one memory card which is set in the terminal body for an IC card, wherein the terminal body for an IC card comprises a first storage for storing a monitor program, the memory card comprises a second storage for storing at least one program, and the application program stored in the IC card is executed in accordance with processing of the monitor program and processing of the program stored in the memory card.

In a preferred embodiment, the second storage of the memory card includes a RAM.

In a preferred embodiment, the second storage of the memory card includes a ROM.

In a preferred embodiment, the program stored in the memory card contains a library program, a program for controlling communications, and an application program.

In a preferred embodiment, the terminal body for an IC card further comprises a switch for changing a state in which the memory card is used or is not used.

In a preferred embodiment, the terminal body for an IC card further comprises an interrupt controller, an input and output for a peripheral device, a resistor, an RS-232C interface, and a modem.

In a preferred embodiment, the first storage provided in the terminal body for an IC card includes a RAM.

In a preferred embodiment, the first storage provided in the terminal body for an IC card includes a ROM.

In a preferred embodiment, the first storage provided in the terminal body for an IC card further stores a BIOS (Basic Input Output System) and a BDOS (Basic Disk Operating System).

According to the above-mentioned system structure, the program related to the monitor portion in the basic system is stored at least in the terminal body, whereby the monitor portion administers, monitors and controls a hardware area such as various kinds of input and output ports and an interrupt processing controller portion. When a ROM/RAM card storing various kinds of programs is set in the terminal body, the monitor portion administers and monitors the other portions (a BIOS portion, a BDOS portion, a library program portion, a program portion for external communications, a program portion for IC card communications, and an application program portion). Thus, various kinds of program portions function.

Thus, the invention described herein makes possible the objective of providing a terminal for an IC card in which a program related to an application system area and an application program other than a program related to a basic system area can readily be exchanged and which has substantially improved applicability.

BRIEF DESCRIPTION OF THE DRAWINGS

This invention may be better understood and its numerous objects and advantages will become apparent to those skilled in the art by reference to the accompanying drawings as follows:

FIG. 5 is a system structure view related to programs of the terminal for an IC card according to the present invention.

DESCRIPTION OF THE PREFERRED EMBODIMENT

Example

Hereinafter, the present invention will be described by way of an illustrative example.

Figure 1:
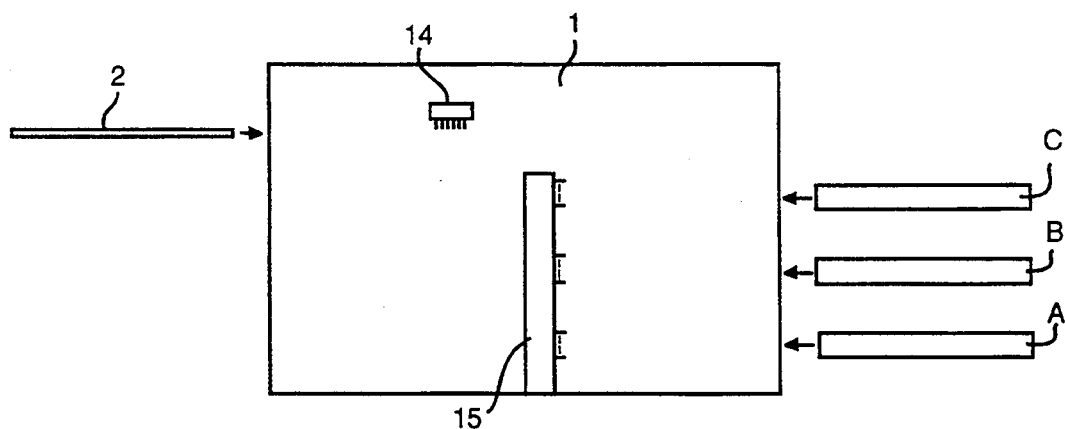
FIG. 1 is a view schematically showing an entire structure of a terminal for an IC card according to the present invention.
Figure 4:
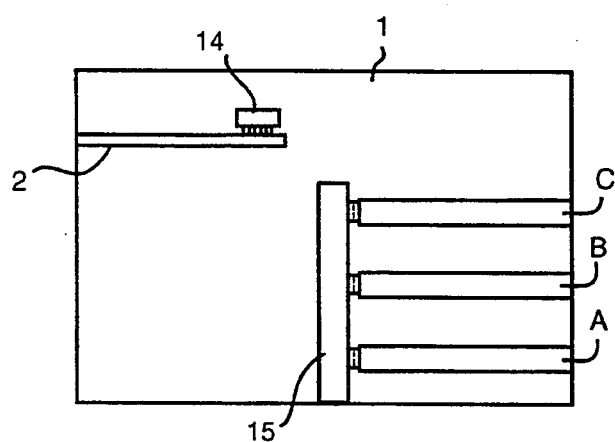
FIG. 4 is a view showing a state in which various kinds of cards are inserted into the terminal for an IC card according to the present invention.
Figure 2:
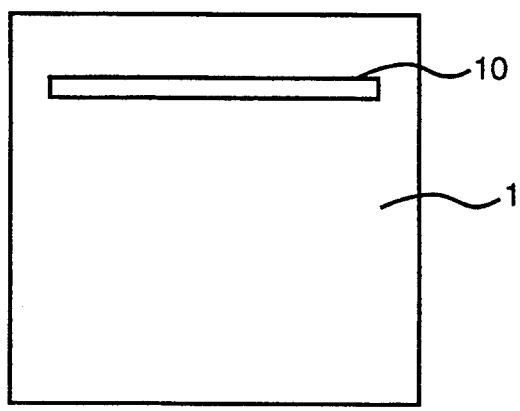
FIG. 2 is a front view showing the terminal for an IC card according to the present invention.
Figure 3:
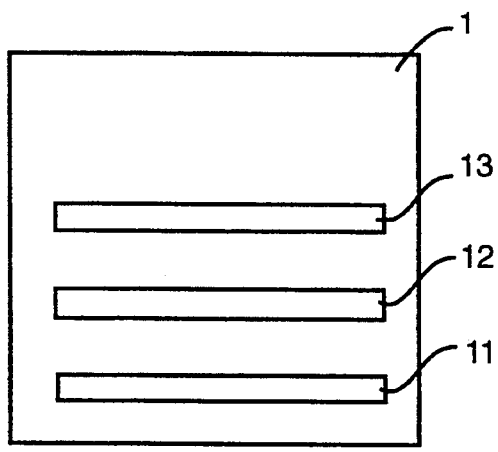
FIG. 3 is a rear view showing the terminal for an IC card according to the present invention.

FIGS. 1 and 4 show a terminal for an IC card according to the present invention. As shown in FIG. 2, an insertion opening 10 for an IC card 2 is provided on the front side of a terminal 1. On the back side of the terminal 1, as shown in FIG. 3, three insertion openings 11, 12, and 13 exclusively for ROM/RAM cards are provided. A ROM/RAM card A is inserted into the lower level insertion opening 11. A ROM/RAM card B is inserted into the middle level insertion opening 12. A ROM/RAM card C is inserted into the upper level insertion opening 13.

FIG. 4 shows a state in which the above-mentioned card is inserted into the terminal 1. When the IC card 2 is inserted into the insertion opening 10, a connector 14 comes into contact with the tip end of the IC card 2, whereby the IC card 2 is electrically connected to the terminal 1. When the ROM/RAM cards A, B, and C are inserted into the insertion openings 11, 12, and 13 on the back side of the terminal 1, the tip ends of the ROM/RAM cards A, B, and C come into contact with a connection 15 in the terminal 1, whereby the respective ROM/RAM cards A, B, and C are electrically connected to the terminal 1. In the terminal 1, a switch for varying the state in which the respective ROM/RAM cards A, B, and C are used or are not used is provided.

Next, the ROM/RAM cards A, B, and C will be described. The ROM/RAM card A stores a library program and is inserted into the insertion opening 11 if required in terms of a system structure. The ROM/RAM card B stores a program for controlling various communications and is inserted into the insertion opening 12 if the IC card 2 is required or communications with external terminals are required in terms of a system structure. The ROM/RAM card C stores an application program and is inserted into the insertion opening 13 if required in terms of a system structure.

FIG. 5 shows a structure (hierarchical structure) of system programs of the terminal 1 when the ROM/RAM cards A, B, and C are inserted. In a terminal body, only a program related to a basic system area 20 which is required for a basic function of the terminal 1 is stored. The basic system area 20 includes a monitor portion 200, a BIOS portion 201, and a BDOS portion 202. More specifically, this program is stored in a ROM/RAM (not shown) mounted in the terminal 1. Programs other than the basic system area 20 are stored in the respective ROM/RAM cards A, B, and C. A library portion 300 containing a library program stored in the ROM/RAM card A and a program portion 301 for controlling communications containing a program for controlling various communications stored in the ROM/RAM card B form an application system area 30. The program portion 301 for controlling communications is composed of a program for controlling IC card communications and a program for controlling communications with external terminals including a device such as an RS-232C interface cable and a modem. An application program stored in the ROM/RAM card C forms an application program are 40.

As for the programs in the application system area 30 and the application program area 40, they are respectively stored in the ROM/RAM cards A, B, and C in accordance with their categories. Plural kinds of operations can be processed by selecting a card which stores a desired program from the ROM/RAM cards A, B, and C.

The application program will be described below. Plural kinds of ROM/RAM cards $C_1, \ldots C_i, \ldots C_n$ are provided and a ROM/RAM card $C_i$ which stores a program $C_i$ (i=1 to n) is inserted into the insertion opening 13, whereby the application of $C_i$ can be performed. More specifically, according to this method, plural kinds of applications can be performed only by exchanging the ROM/RAM cards C, and plural kinds of operations can be coped with. Thus, the applicability of the terminal 1 can be substantially improved.

Moreover, a program for IC card communications will be described. Plural kinds of ROM/RAM cards $B_1, \ldots B_i, \ldots B_n$ are provided and a ROM/RAM card $B_i$ which stores a program $B_i$ (i=1 to n) is inserted into the insertion opening 13, whereby the application of $B_i$ can be performed. Even in the case where it is not known which IC card should be used, ROM/RAM cards B are successively exchanged, whereby a suitable IC card can be selected. Thus, various kinds of IC cards can be used in one terminal for an IC card, and the applicability of the terminal is improved.

Figure 6:
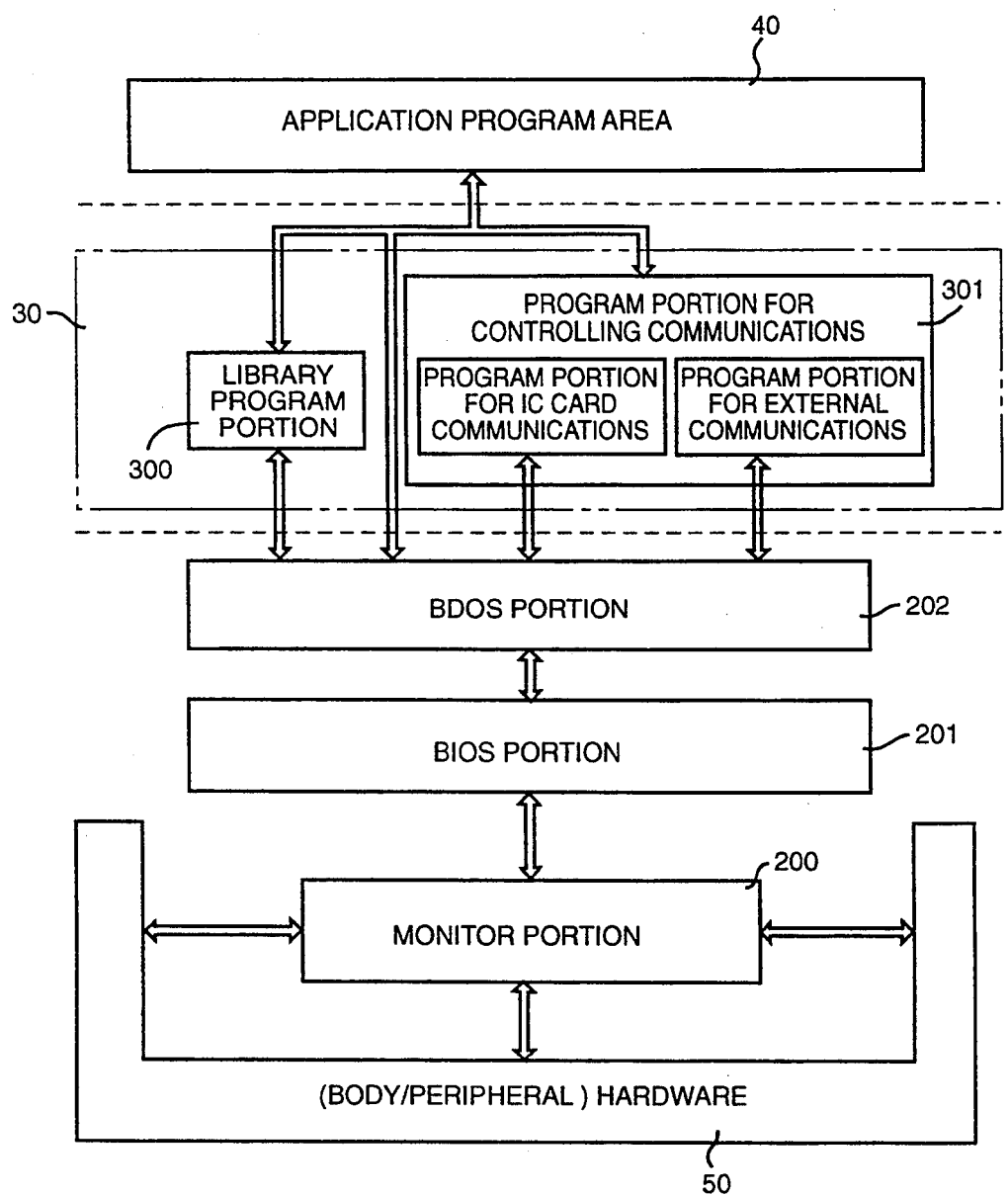
FIG. 6 is a system structure view showing a working atmosphere of the terminal for an IC card according to the present invention.
Figure 7:
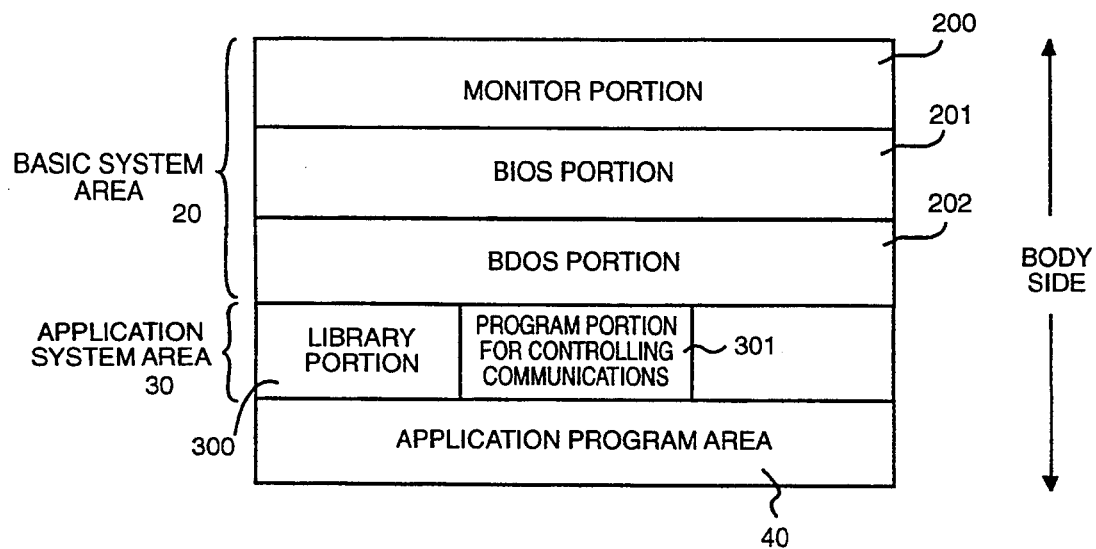
FIG. 7 is a system structure view related to programs according to an conventional example.

Next, the working atmosphere of the terminal system of the present invention will be described with reference to FIG. 6.

(i) The monitor portion 200 is a control center of the terminal 1. The monitor portion 200 controls the terminal body and a peripheral hardware 50 equipped with various kinds of input and output ports and resistors as well as administers and monitors various kinds of processing such as initialization processing and interrupt processing. When either type of processing mentioned above is selected in the monitor portion 200, processing is performed in accordance with a control program stored in the corresponding ROM. On this monitor portion 200, various kinds of upper level systems such as the application program area 40, the library program portion 300, and the program portion for controlling communications 301 function.

(ii) The BIOS portion 201 executes a process related with various kinds of physical processes and the hardware 50. However, those processes are monitored by the monitor portion 200, and the BIOS portion 201 performs the above-mentioned processing in accordance with control commands from the monitor portion 200.

(iii) The BDOS portion 202 performs various kinds of arithmetic logic processing. In the case where physical processes and the hardware 50 are required to be controlled, the BIOS portion 201 controls them by a conversion processing. The monitor portion 200 monitors the processing in the BDOS portion 202.

(iv) The library program portion 300 and the program portion 301 for controlling communications in the application system area 30 are driven when the application program is required to function. When the application program is not required to function, in some cases, the BDOS portion 202 is directly driven. The whole processing operations in the application system area 30 are monitored by the monitor portion 200.

(v) The application program area 40 mainly processes the application programs for each operation stored in the IC card 2. The application program area 40 drives itself as well as a lower level (the application system area 30 or the basic system area 20), thereby performing processing. As to the application program area 40, the monitor portion 200 monitors the whole processing operation.

In the above-mentioned examples, all of the programs related to the basic system area 20 are stored in the ROM mounted in the terminal 1. Any programs stored in the ROM/RAM can be used as long as they are at least related to the monitor portion 200.

As described above, the terminal for an IC card according to the present invention has a system structure in which programs are sorted on the basis of hierarchies, categories or applications, and required programs alone are stored in the ROM/RAM body and ROM/RAM cards. Thus, programs can be exchanged in accordance with operations so that operations for a number of purposes and of various kinds can readily be coped with. Accordingly, the applicability of the terminal for an IC card can substantially be improved.

Moreover, programs can be developed by hierarchies and categories, so that the efficiency for developing programs can be improved. Furthermore, there is an advantage in that the correction, renewal, and exchange of programs can readily be performed by correcting, renewing, and exchanging the contents of the ROM/RAM card.

It is understood that various other modifications will be apparent to and can be readily made by those skilled in the art without departing from the scope and spirit of this invention. Accordingly, it is not intended that the scope of the claims appended hereto be limited to description as set forth herein, but rather that the claims be construed as encompassing one or more of the features of patentable novelty that reside in the present invention, including all features that would be treated as equivalents thereof by those skilled in the art to which this invention pertains.

What is claimed is:

1. A terminal for an IC card, the terminal having a terminal body comprising
    storage means for storing a monitor program;
    IC connection means for electrical connection with an IC card; and
    hierarchical modular memory connecting means for providing electrical connection with a plurality of memory cards, said hierarchical modular connection means including a first level application system connection means for providing electrical connection with a memory card storing a library program and electrical connection with a memory card storing a communication program, said hierarchical modular connection means further including a second level application program connection means for electrical connection with a memory card storing an application program.

2. A terminal for an IC card according to claim 1, wherein the terminal body further comprises a switch for changing a state in which a memory card is used or is not used.

3. A terminal for an IC card according to claim 1, wherein the terminal body further comprises an interrupt controller, an input and output for a peripheral device, an RS-232C interface, and a modem.

4. A terminal for an IC card according to claim 1, wherein the storage means includes a RAM device.

5. A terminal for an IC card according to claim 1, wherein the storage means includes a ROM device.

6. A terminal for an IC card according to claim 1, wherein the storage means further stores a BIOS (Basic Input Output System) and a BDOS (Basic Disc Operating System).

* * * * *